(12) United States Patent  
Platow

(10) Patent No.: US 11,474,696 B2  
(45) Date of Patent: Oct. 18, 2022

(54) SYSTEMS AND METHODS FOR PROVIDING AUTOMATIC DOCUMENT FILLING FUNCTIONALITY

(71) Applicant: LexisNexis, a division of Reed Elsevier Inc., Miamisburg, OH (US)

(72) Inventor: Eric Platow, Harleysville, PA (US)

(73) Assignee: LEXISNEXIS, A DIVISION OF REED ELSEVIER INC., Miamisburg, OH (US)

( * ) Notice: Subject to any disclaimer, the term of this patent is extended or adjusted under 35 U.S.C. 154(b) by 149 days.

(21) Appl. No.: 16/111,427

(22) Filed: Aug. 24, 2018

(65) Prior Publication Data

US 2019/0065456 A1    Feb. 28, 2019

Related U.S. Application Data

(60) Provisional application No. 62/551,553, filed on Aug. 29, 2017.

(51) Int. Cl.
  *G06F 3/04895* (2022.01)
  *G06F 3/0482* (2013.01)
  (Continued)

(52) U.S. Cl.
  CPC ........ *G06F 3/04895* (2013.01); *G06F 3/0482* (2013.01); *G06F 40/106* (2020.01); *G06F 40/143* (2020.01); *G06F 40/174* (2020.01)

(58) Field of Classification Search
  CPC .... G06F 17/243; G06F 17/212; G06F 3/0482; G06F 3/04895; G06F 40/174; G06F 40/143; G06F 40/106
  See application file for complete search history.

(56) References Cited

U.S. PATENT DOCUMENTS 6,651,217 B1 * 11/2003 Kennedy ............... G06F 40/174  
  715/224  
7,334,187 B1 * 2/2008 Stanciu ................. G06F 40/154  
  715/222

(Continued)

FOREIGN PATENT DOCUMENTS

KR      100339643      6/2002  
KR      20090089601    8/2009  
KR      20110130960    12/2011

OTHER PUBLICATIONS

A. Gal and J. Mylopoulos, "Toward Web-based application management systems," in IEEE Transactions on Knowledge and Data Engineering, vol. 13, No. 4, pp. 683-702, Jul.-Aug. 2001, doi: 10.1109/69.940740. (Year: 2001).*

(Continued)

*Primary Examiner* — Stephen S Hong  
*Assistant Examiner* — Nicholas Hasty  
(74) *Attorney, Agent, or Firm* — Dinsmore & Shohl LLP

(57) ABSTRACT

Systems and methods for providing automatic document filling functionality are described. A method includes providing, by a processing device, an integrated interface that includes a document editing component having a document display area for displaying a document and one or more document editing features for editing a document and a document fill component having contents that elicit one or more inputs that are used to fill the document. The method further includes receiving, via the document fill component of the integrated interface, one or more inputs that correspond to data to be inputted into the document, determining, by the processing device, one or more locations within the document to input the data, and inserting the data into the one or more locations within the document.

13 Claims, 15 Drawing Sheets

(51) Int. Cl.
*G06F 40/174* (2020.01)
*G06F 40/106* (2020.01)
*G06F 40/143* (2020.01)

(56) References Cited

U.S. PATENT DOCUMENTS

| | | | |
|---|---|---|---|
| 7,343,551 B1* | 3/2008 | Bourdev | G06F 40/174 715/224 |
| 8,214,362 B1 | 7/2012 | Djabarov | |
| 8,578,265 B2 | 11/2013 | Bajohr et al. | |
| 9,430,455 B2 | 8/2016 | Schuster | |
| 9,600,801 B2 | 3/2017 | Bushnell et al. | |
| 9,785,627 B2* | 10/2017 | Campanelli | G06F 40/174 |
| 2003/0105760 A1* | 6/2003 | Sini | G06F 16/957 |
| 2003/0163782 A1 | 8/2003 | Owen | |
| 2005/0004885 A1 | 1/2005 | Pandian et al. | |
| 2006/0007189 A1* | 1/2006 | Gaines | G06F 40/174 345/179 |
| 2008/0120257 A1* | 5/2008 | Goyal | G06F 16/9535 706/12 |
| 2008/0209313 A1* | 8/2008 | Gonser | G06F 40/186 715/255 |
| 2012/0063684 A1* | 3/2012 | Denoue | G06K 9/00449 382/175 |
| 2013/0036348 A1* | 2/2013 | Hazard | G06F 40/123 715/230 |
| 2014/0181643 A1 | 6/2014 | Hargarten et al. | |

OTHER PUBLICATIONS

PCT International Search Report and Written Opinion of the International Searching Authority for PCT/US18/48050, dated Dec. 17, 2018, 13 pages.

Extended European Search Report dated May 27, 2021 in European Application No. 18849701.0, 6 pages.

\* cited by examiner

```
<questionnaire>CR LF
  <question group="Date Group" questionId="1" fieldName="Date_Agreement" isVisible="true" lockable="true">CR LF
    <text>What is the date this agreement will be made?</text>CR LF
    <response>Month, day, year</response>CR LF
    <startValue>Month, day, year</startValue>CR LF
    <isLocked>false</isLocked>CR LF
    <type>date</type>CR LF
  </question>CR LF
  <question group="Party Group" questionID="2" fieldName="Buyer" isVisible="true" lockable="false">CR LF
    <text>Who is the Buyer?</text>CR LF
    <response>The Buyer</response>CR LF
    <startValue>The Buyer.</startValue>CR LF
    <isLocked>false./isLocked>CR LF
    <type>string,/type>CR LF
  </question>CR LF
  <question group="Payment Group" questionId="14" fieldName="PaymentType" isVisible="true" lockable="false">CR LF
    <text>How will payment be remitted to the Service Provider?</text>CR LF
    <response>check/wire transfer/credit card payment</response>CR LF
    <startValue>check,wire transfer, credit card paument</startValue>CR LF
    <isLocked>false</isLocked>CR LF
    <type>dropdown</type>CR LF
    <dropdownList>CR LF
```

FIG. 12A

```
<dropdownItem value="check/wire transfer/credit card payment" altValue="0">check/wire transfer/credit card payment</dropdownItem>CR LF
    <dropdownItem value="check" altValue="1">check</dropdownItem>CR LF
    <dropdownItem value="wire transfer" altValue="2">wire transfer</dropdownItem>CR LF
    <dropdownItem value="credit card payment" altValue="3">credit card payment</dropdownItem>CR LF
</dropdownList>CR LF
<ruleList>CR LF
    <rule ruleId="1">CR LF
        <ifUserSetValue>check<ifUserSetValue>CR LF
        <hideList>CR LF
            <hideItem idType="fieldName">TransferParty</hideItem>CR LF
            <hideItem idType="fieldName">CreditDetails</hideItem>CR LF
        </hideList>CR LF
        <showList>CR LF
            <showItem idType="fieldname">AddressCheck</showItem>CR LF
        </showList>CR LF
        <hiddenClauseList>CR LF
            <hiddenClause fieldName="FundsAvailability">CheckAccountFundsPara</hiddenClause>CR LF
        </hiddenClauseList>CR LF
```

FIG. 12B

```xml
<question group="Date Group" questionId="14" fieldName="PaymentType" isVisible="true" lockable="false">
   <text>How will payment be remitted to the Service Provider?</text>
   <response>check/wire transfer/credit card payment</response>
   <startValue>check,wire transfer,credit card payment</startValue>
      <isLocked>false</isLocked>
   <type>dropdown</type>
      <dropdownList>
         <dropdownItem value="check/wire transfer/credit card payment" altValue="0"> check/wire transfer/credit card payment</dropdownItem>
         <dropdownItem value="check" altValue="1">check</dropdownItem>
         <dropdownItem value="wire transfer" altValue="2">wire transfer</dropdownItem>
         <dropdownItem value="credit card payment" altValue="3">credit card payment</dropdownItem>
      </dropdownList>
      <ruleList>
         <rule ruleId="1">
            <ifUserSetValue>check</ifUserSetValue>
            <hideList>
               <hideItem idType="fieldName">TransferParty</hideItem>
               <hideItem idType="fieldName">CreditDetails</hideItem>
            </hideList>
            <showList>
               <showItem idType="fieldName">AddressCheck</showItem>
            </showList>
            <hiddenClauseList>
               <hiddenClause fieldName="FundsAvailability">CheckAccountFundsPara</hiddenClause>
            </hiddenClauseList>
         </rule>
```

FIG. 12C continued from FIG. 12C — (1)

continued from FIG. 12C — (1)

```xml
<rule ruleId="2">
    <ifUserSetValue>wire transfer</ifUse6rSetValue>
    <hideList>
        <hideItem idType="fieldName">AddressCheck</hideItem>
        <hideItem idType="fieldName">CreditDetails</hideItem>
    </hideList>
    <showList>
        <showItem idType="fieldName">TransferParty</showItem>
    </showList>
    <hiddenClauseList>
        <hiddenClause fieldName="FundsAvailability">ElectronicFundsPara</hiddenClause>
    </hiddenClauseList>
</rule>
<rule ruleId="3">
    <ifUserSetValue>credit card payment</ifUserSetValue>
    <hideList>
        <hideItem idType="fieldName">AddressCheck</hideItem>
        <hideItem idType="fieldName">TransferParty</hideItem>
    </hideList>
    <showList>
        <showItem idType="fieldName">CreditDetails</showItem>
    </showList>
    <hiddenClauseList>
        <hiddenClause fieldName="FundsAvailability"></hiddenClause>
    </hiddenClauseList>
</rule>
<rule ruleId="4">
    <ifUserSetValue>check/wire transfer/credit card payment</ifUserSetValue>
    <showList>
        <showItem idType="fieldName">AddressCheck</showItem>
        <showItem idType="fieldName">TransferParty</showItem>
        <showItem idType="fieldName">CreditDetails</showItem>
    </showList>
    <hiddenClauseList>
        <hiddenClause fieldName="FundsAvailability"></hiddenClause>
    </hiddenClauseList>
</rule>
    </ruleList>
</question>
```

FIG. 12D

SYSTEMS AND METHODS FOR PROVIDING AUTOMATIC DOCUMENT FILLING FUNCTIONALITY

CROSS-REFERENCE TO RELATED APPLICATION

The present application claims priority to U.S. Provisional Patent Application No. 62/551,553, filed Aug. 29, 2017 and entitled "Systems And Methods For Providing An Automatic Form Fill," the contents of which is incorporated herein in its entirety.

BACKGROUND

Field

The present specification generally relates to providing an add-in for an existing software program and, more particularly, to systems and methods that provide an add-in to assist a user in generating and modifying a document in an existing software program.

Technical Background

Currently, users of software programs, such as word processing programs, spreadsheet programs, and/or the like, must generate and modify documents within those programs by manually entering data into each field within the document. Certain documents may be lengthy and have several fields that must be completed. Some of those fields may have repetitive information within them, but nevertheless must be completed by a user. Certain documents may also include fields that may not clearly direct a user to fill the field, or may not accurately specify the information that is to be included in the form. In addition, users may accidentally enter incorrect information in a particular field, enter information into the wrong field, use an incorrect format, enter information into fields that are not intended to have data entered therein, and/or the like.

SUMMARY

In one embodiment, a method for providing automatic document filling functionality includes providing, by a processing device, an integrated interface that includes a document editing component having a document display area for displaying a document and one or more document editing features for editing a document and a document fill component having contents that elicit one or more inputs that are used to fill the document. The method further includes receiving, via the document fill component of the integrated interface, one or more inputs that correspond to data to be inputted into the document, determining, by the processing device, one or more locations within the document to input the data, and inserting the data into the one or more locations within the document.

In another embodiment, a system for providing automatic document filling functionality includes a processing device and a non-transitory, processor-readable storage medium. The non-transitory, processor-readable storage medium comprising one or more programming instructions that, when executed, cause the processing device to provide an integrated interface that includes a document editing component having a document display area for displaying a document and one or more document editing features for editing a document and a document fill component having contents that elicit one or more inputs that are used to fill the document. The non-transitory, processor-readable storage medium further comprises one or more programming instructions that, when executed, cause the processing device to receive, via the document fill component of the integrated interface, one or more inputs that correspond to data to be inputted into the document, determine one or more locations within the document to input the data, and insert the data into the one or more locations within the document.

In yet another embodiment, a system for providing automatic document filling functionality includes a user computing device that provides a first portion of an integrated interface, the first portion of the integrated interface having a document editing component with a document display area for displaying a document and one or more document editing features for editing a document and a server computing device that is remote from the user computing device, the server computing device providing a second portion of the integrated interface having a document fill component with contents that elicit one or more inputs that are used to fill the document. The user computing device includes a display that displays the first portion and the second portion of the integrated interface and an input device that receives one or more inputs at one or more of the first portion and the second portion of the integrated interface. The user computing device receives, via the document fill component, one or more document editing inputs that correspond to data to be inputted into the document. The server computing device determines one or more locations within the document to input the data. The server computing device inserts the data into the one or more locations within the document.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structures are indicated with like reference numerals and in which:

FIG. 12A depicts code of an illustrative XML file that is used to fill particular fields within a document according to one or more embodiments shown and described herein;

FIG. 12B depicts additional code of an illustrative XML file that is used to fill particular fields within a document according to one or more embodiments shown and described herein;

FIG. 12C depicts more code of an illustrative XML file that is used to fill particular fields within a document according to one or more embodiments shown and described herein; and FIG. 12D depicts more code of an illustrative XML file that is used to fill particular fields within a document according to one or more embodiments shown and described herein.

DETAILED DESCRIPTION

Figure 1:
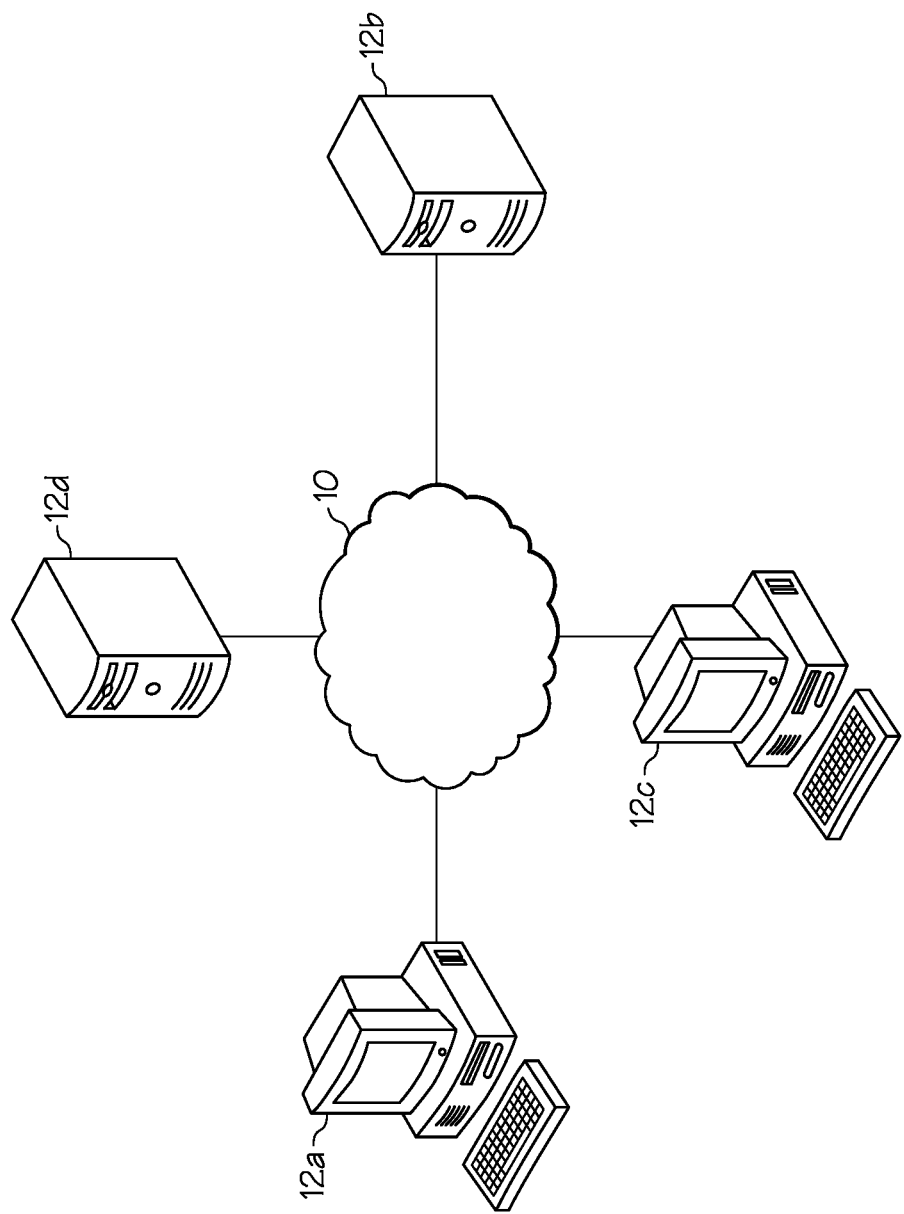
FIG. 1 schematically depicts an illustrative computing network for a system providing automatic document filling functionality according to one or more embodiments shown and described herein.

Referring generally to the figures, embodiments described herein are directed to systems, methods, and computer-readable media for providing a software addition (e.g., an add-in, a plugin, or the like) to an existing software program, such as a word processing program. The software addition generally provides document fill functionality that allows a user of the existing software program to provide answers to a series of questions and/or complete a plurality of sections of a document to be edited in addition to, or instead of, directly editing the document within the existing software program. A plurality of fields within the document that correspond to the series of questions are populated based on the user's entries. As a result, the populated document is correctly filled with accurate information that is consistent throughout the document. In addition, the user may be less confused about what information to put in particular fields in the document. Moreover, the user has an ability to remain within his/her preferred document editing program without having to switch back and forth with a different and unfamiliar software program, and can instantly view all of the changes that are made to the document to ensure they align with what the user desires. The user is free to make any and all text or formatting changes as they see fit. The user also can lock the document down entirely or in parts in order to collaborate with others. Finally, since there is only one system generating the document and integrating document filling capabilities, there are no conversions made between any systems and thus no loss of content/formatting.

As used herein, a "document" generally refers to any electronic file that contains information and is editable by a user using a software program. That is, a "document" may be a text document (e.g., a word processing file), a spreadsheet, a slide presentation, or the like. For example, an illustrative document is a Microsoft® Word document file (e.g., a file appended with the .docx file extension). The document can be opened with a corresponding program (e.g., Microsoft® Word) and edited by a user. In some embodiments, the document may contain one or more fields that are editable by a user (e.g., a form document having one or more form fields). In some embodiments, the document may be a template document or derived from a template document. The present disclosure uses legal documents as an example, but this is merely illustrative. That is, the present disclosure is not limited to legal documents, and can be used for other types of documents, including invoices, medical forms, and the like.

As used herein, "document filling" generally refers to a population of an electronic document with data and/or information. For example, a text document may be populated with text, images, numbers, equations, and/or the like. One particular example is a legal document such as a contract, which may be populated with one or more contract sections including, but not limited to, textual identification of the parties, textual identification of the terms, fields for comments and/or revisions, fields for signatures and dates, and/or the like.

Referring now to the drawings, FIG. 1 depicts an illustrative computing network that depicts components for a system for providing document filling functionality according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more computing devices and/or components thereof. Illustrative computing devices may include, but are not limited to, a user computing device 12a, a server computing device 12b, an administrator computing device 12c, and an external data source computing device 12d.

The user computing device 12a may generally be used as an interface between a user and the other components connected to the computer network 10. Thus, the user computing device 12a may be used to perform one or more user-facing functions, such as receiving one or more inputs from a user or providing information to the user, as described in greater detail herein. Accordingly, the user computing device 12a may include at least a display and/or user input hardware. In some embodiments, the user computing device 12a may contain the software and/or the software addition that provides the document filling functionality and/or connects to a remote computing device that provides the document filling functionality, as described herein. Additionally, included in FIG. 1 is the administrator computing device 12c. In the event that the server computing device 12b requires oversight, updating, or correction, the administrator computing device 12c may be configured to provide the desired oversight, updating, and/or correction.

The administrator computing device 12c may also be used to input additional data into a corpus of data stored on the server computing device 12b.

The server computing device 12b may receive data from one or more sources, generate data, store data, index data, search data, and/or provide data to the user computing device 12a in the form of a software program, document fills, an embedded webpage, and/or the like.

The external data source computing device 12d may generally be a repository for saving search strings, corresponding search results, user-stored data, data from third party providers, and/or the like.

It should be understood that while the user computing device 12a and the administrator computing device 12c are depicted as personal computers and the server computing device 12b and the external data source computing device 12d are depicted as servers, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 12a, the server computing device 12b, the administrator computing device 12c, and the external data source computing device 12d may represent a plurality of computers, servers, databases, components, and/or the like.

Figure 2:
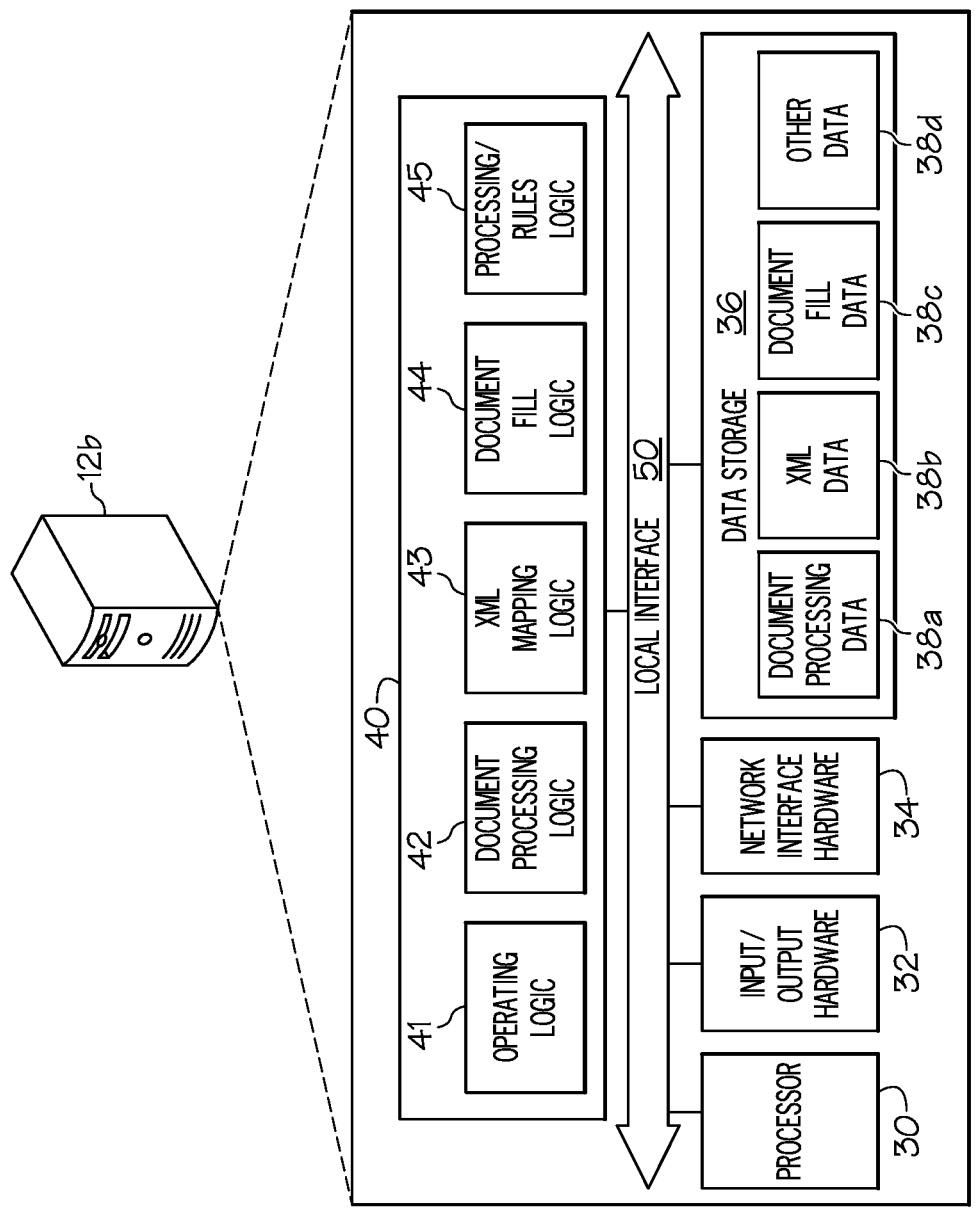
FIG. 2 schematically depicts the server computing device from FIG. 1, further illustrating hardware and software that may be used in providing automatic document filling functionality according to one or more embodiments shown and described herein.

FIG. 2 depicts the server computing device 12b, from FIG. 1, further illustrating a system for providing automatic document filling functionality. While the components depicted in FIG. 2 are described with respect to the server computing device 12b, it should be understood that similar components may also be used for the user computing device 12a, the administrator computing device 12c, and/or the external data source computing device 12d (FIG. 1) without departing from the scope of the present disclosure.

The server computing device 12b may include a non-transitory computer-readable medium for searching and providing data embodied as hardware, software, and/or firmware, according to embodiments shown and described herein. While in some embodiments the server computing device 12b may be configured as a general purpose computer with the requisite hardware, software, and/or firmware, in other embodiments, the server computing device 12b may also be configured as a special purpose computer designed specifically for performing the functionality described herein. In embodiments where the server computing device 12b is a general purpose computer, the methods described herein generally provide a means of improving a matter that resides wholly within the realm of computers and the internet. More specifically, the server computing device 12b improves the user facing functions available to a user of the user computing device 12a (FIG. 1) by presenting a combined interface that is partially provided by the user computing device 12a and partially provided by the server computing device 12b, but appears as a single integrated interface to a user of the user computing device 12a. That is, the user computing device 12a (FIG. 1) provides document editing software (e.g., a word processing program, a spreadsheet editing program, a presentation program, and/or the like) that is installed on the user computing device 12a (or from a source other than the server computing device 12b) alongside an add-in that connects to the server computing device 12b to receive the automatic document filling functionality, processing logic, and/or a rules engine, but appears as a pane within the document editing software, as described in greater detail herein. As a result of this atypical arrangement, the user views a single interface that includes elements from the user computing device 12a (FIG. 1) and elements from the server computing device 12b, where the elements from the respective devices may not be apparent to the user, but together provide the functionality described herein.

Still referring to FIG. 2, the server computing device 12b may include a processor 30, input/output hardware 32, network interface hardware 34, a data storage component 36 (which may store document processing data 38a, extensible markup language (XML) data 38b, document fill data 38c, and/or other data 38d), and a non-transitory memory component 40. The non-transitory memory component 40 may be configured as a volatile and/or a nonvolatile computer-readable medium and, as such, may include random access memory (including SRAM, DRAM, and/or other types of random access memory), flash memory, registers, compact discs (CD), digital versatile discs (DVD), and/or other types of storage components. As such, the non-transitory memory component may be referred to as a non-transitory, processor-readable storage medium. Additionally, the non-transitory memory component 40 may be configured to store various processing logic, such as, for example, operating logic 41, document processing logic 42, XML mapping logic 43, document fill logic 44, and/or processing/rules logic 45 (each of which may be embodied as a computer program, firmware, or hardware, as an example). A local interface 50 is also included in FIG. 2 and may be implemented as a bus or other interface to facilitate communication among the components of the server computing device 12b.

The processor 30 may include any processing component configured to receive and execute instructions (such as from the data storage component 36 and/or the non-transitory memory component 40). The input/output hardware 32 may include a monitor, keyboard, mouse, printer, camera, microphone, speaker, touch-screen, and/or other device for receiving, sending, and/or presenting data (e.g., a device that allows for direct or indirect user interaction with the server computing device 12b alongside the user computing device 12a (FIG. 1)). The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data and selectively provide access to the one or more pieces of data. As illustrated in FIG. 2, the data storage component 36 may store document processing data 38a, XML data 38b, document fill data 38c, and/or other data 38d. The document processing data 38a may generally be data and/or information regarding one or more documents that are edited and/or created by a user via the user computing device 12a (FIG. 1). That is, the document processing data 38a may include word processing documents, spreadsheet documents, presentation documents, template documents, and/or the like. In addition, the document processing data 38a may further include data associated with the various documents, including XML data 38b and/or the like. For example, certain document file formats (e.g., the .docx and .xlsx document file formats) may be compressed files that, when uncompressed, contain a plurality of interrelated files and/or data, such as XML files, document property data, comments data, fonts data, settings data, style data, effects data, web settings data, theme data, content data, and/or the like. The XML data 38*b* may generally be data and/or rules that are used to define the software program and/or the add-in or plugin that is provided to a user via the user computing device 12*a* (FIG. 1). Accordingly, the XML data 38*b* may be stored within the data storage component 36 and/or within a similar component within the user computing device 12*a* (FIG. 1). Still referring to FIG. 2, the document fill data 38*c* is generally data that pertains to one or more options, questions, or the like that are provided to a user at the user computing device 12*a* (FIG. 1) for the purposes of filling out portions of documents edited by users at the user computing device 12*a*, such as, for example, portions of the documents stored in the document processing data 38*a*. That is, the document fill data 38*c* may contain one or more questions, one or more prepopulated answer options, data pertaining to responses that are typed in by a user (or otherwise selected by a user) at the user computing device 12*a* (FIG. 1), map data that is used to correlate the one or more questions with one or more areas of an edited document, and/or the like. As such, each question in a document fill pane may be appropriately mapped to one or more sections of a document such that, when a user enters a response to the question in the document fill pane, the appropriate one or more sections of the document will be populated accordingly, as described in further detail herein. Still referring to FIG. 2, the other data 38*d* may generally encompass any other data that may be generated and/or stored for the purposes of providing automatic document filling functionality as described herein. For example, the other data 38*d* may include prior answers that are used to fill a document with data that a particular user has previously provided so that the user need to provide the information again, data pertaining to a suite of documents such that a supplied input from a user is applied to each document in a suite, audit history data, data relating to calculations that may be performed, user-entered data that is supplied directly in a document and automatically populated accordingly throughout the document, and/or the like.

Still referring to FIG. 2, included in the non-transitory memory component 40 are the operating logic 41, the document processing logic 42, the XML mapping logic 43, the document fill logic 44, and/or the processing/rules logic 45. The operating logic 41 may include an operating system and/or other software for managing components of the server computing device 12*b*. The document processing logic 42 may generally provide instructions for retreiving a document and/or a template, setting up the document and/or template for use by the user, determining which fields within the document can be edited by the user, and/or the like, as described in greater detail herein. The XML mapping logic 43 may generally contain instructions for accessing and/or reading XML code associated with a particular document for the purposes of determining which fields within the document can be edited directly by a user, which fields can be populated using a document fill component or the like, mapping one or more questions and answers within a document fill component with one or more fields in the document, and/or the like, as described in greater detail herein. The document fill logic 44 may generally provide programming instructions for generating a document fill component with contents that can be used to elicit particular user responses that are then used to populate a document. For example, the document fill logic 44 may provide one or more document fill component areas (including generating one or more questions and/or answers or answer fields within the document fill component that correspond to fields within a document, based on XML data), providing a document fill component to a user via the integrated user interface presented on the user computing device 12*a* (FIG. 1), receiving a selected response from a user and/or an inputted text response from a user, and/or the like. The processing/rules logic 45 may provide one or more rules for processing a document, including rules for where particular fields are located, which fields can be modified, which fields cannot be modified, and/or the like.

It should be understood that the components illustrated in FIG. 2 are merely illustrative and are not intended to limit the scope of this disclosure. More specifically, while the components in FIG. 2 are illustrated as residing within the server computing device 12*b*, this is a nonlimiting example. In some embodiments, one or more of the components may reside external to the server computing device 12*b*. Similarly, as previously described herein, while FIG. 2 is directed to the server computing device 12*b*, other components such as the user computing device 12*a*, the administrator computing device 12*c*, and the external data source computing device 12*d* (FIG. 1) may include similar hardware, software, and/or firmware.

As mentioned above, the various components described with respect to FIGS. 1 and 2 may be used to carry out one or more processes and/or provide document filling functionality. An illustrative example of the various processes that may be carried out by the various components described with respect to FIGS. 1 and 2 is described with respect to FIGS. 3 and 11.

Figure 3:
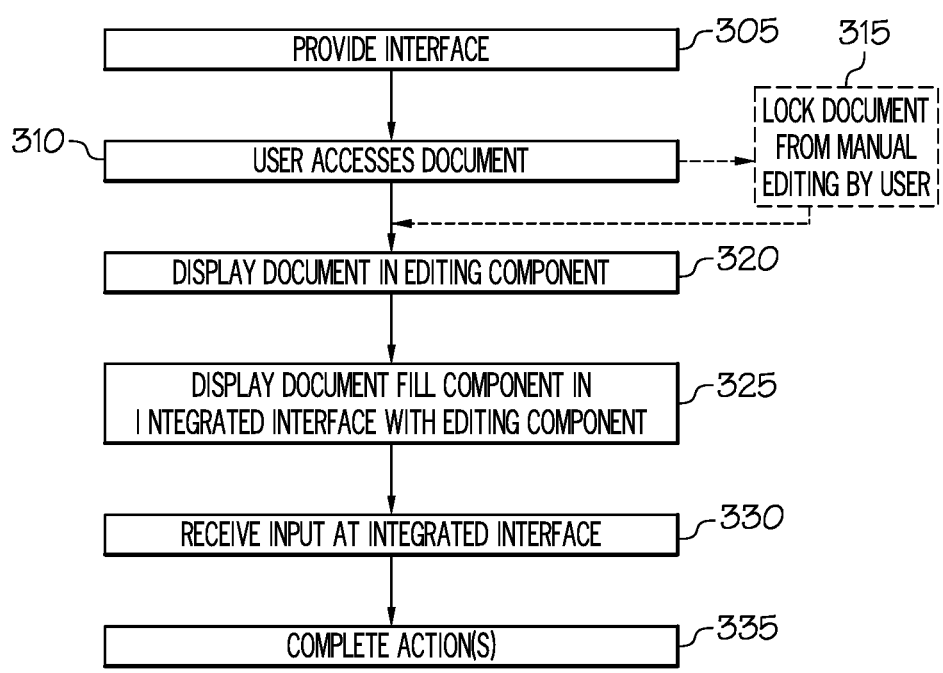
FIG. 3 depicts a flow diagram of an illustrative general overview method of providing automatic document filling functionality according to one or more embodiments shown and described herein.

FIG. 3 relates to a general method of providing automatic document filling functionality. Referring now to FIGS. 1-4, the interface may be provided to the user at the user computing device 12*a* at block 305. More specifically, an integrated user interface 400 may be provided to the user at the user computing device 12*a*. That is, the user may view a single interface that includes a document editing program (e.g., Microsoft® Word, Microsoft® Excel, Microsoft® PowerPoint) as well as a window, pane, and/or the like presented within or alongside the document editing program that contains contents that are provided for the purposes of eliciting one or more responses from a user that can be used to populate the document. For example, as shown in the embodiment depicted in FIG. 4, the integrated user interface 400 may include a document editing component 401 and a document fill component 410. As previously described herein, the content within the document editing component 401 may be locally provided by the user computing device 12*a* and the document fill component 410 is remotely provided by the server computing device 12*b* in some embodiments. However, in other embodiments, both the document editing component 401 and the document fill component 410 may be locally provided by the user computing device 12*a* or remotely provided by the server computing device 12*b*. In yet other embodiments, the document editing component 401 may be provided by a first server computing device and the document fill component 410 may be provided by a second server computing device (e.g., a software program provided over the Internet, such as a cloud-based word processing program), and are displayed on a screen of the user computing device 12*a*. As such, the various steps described herein can be completed while "offline" (i.e., completed without a network connection) in some embodiments. In other embodiments, the program may be accessed remotely via a network or may contain certain features that are accessed remotely via a network. For example, the program may be a word processor that has basic functionality from software that is locally installed on a device, but accesses documents and/or software pertaining to enhanced functionality from a network server.

The document editing component 401 and the document fill component 410 may generally be provided in any arrangement or configuration within the integrated user interface 400. For example, the document editing component 401 and the document fill component 410 may be provided in a side-by-side arrangement such that a user is able to view the changes to the document displayed within the document editing component 401 when selecting items within the document fill component 410, as described in greater detail herein. In another example, the document fill component 410 may be arranged such that it overlays at least a portion of the document editing component 401.

The document editing component 401 includes a document display area 402 and one or more document editing features 403, such as buttons, menus, and/or the like that a user can utilize to change various characteristics of the document in the document display area 402. For example, a user may select one or more buttons, menus, and/or the like to cut, copy, and/or paste text, utilize a format painter tool, change font settings, change paragraph and spacing settings, select styles, and/or the like within the document editing component 401. The user may also select portions of the document within the document display area 402, such as, for example, document sections 404, editable fields 406, and/or the like. The user may also view one or more callouts 408 that may not be part of the document, but may be displayed alongside the document (or overtop the document) in the document display area 402 (or even shown within the document fill component 410), and may provide information with respect to portions of the document display area 402, the document, and/or the like. In the embodiment depicted in FIG. 4, the document displayed in the document display area 402 is a legal contract that contains a field for entering a start date and the one or more callouts 408 provide information that may be useful to a user in filling the start date, such as, for example, explaining what the start date is. These callouts can also suggest alternate wording, optional clauses or other potential language and/or phrases or clauses that can be used. The document fill component 410 may also provide the callouts 408 to provide additional information that is generated as a result of acquisition of additional real time insights. In the example of a legal document, one or more searches may be run to determine how often a clause is litigated and how successful the lawsuits are in upholding or ruling against certain clauses. It should be understood that the software that provides the document editing component 401 may generally be installed locally on the user computing device 12a (e.g., within a memory component and/or a data storage component of the user computing device 12a).

The document fill component 410 may generally provide one or more fields for assisting the user in filling out the document within the document display area 402 of the document editing component 401. In an initial state, such as the state depicted in the embodiment of FIG. 4, the document fill component 410 may include an authentication screen 412. The authentication screen 412 may include, for example, one or more fields for entering a user name and/or a password, and/or one or more other fields for identifying and/or authenticating the user. It should be understood that the authentication screen 412 is optional and may not be provided in some embodiments. The document fill component 410 may also have other components or the like for providing automatic document filling functionality, as shown and described hereinbelow. The document fill component 410 may generally be an add-in or a plugin to the document editing component 401 provided via software stored on the server computing device 12b and/or another remote computing device, and may generally not be generated from software stored locally on the user computing device 12a.

Because of this arrangement of the integrated user interface 400, the user may perceive the interface to be a single interface on the user computing device 12a and may not be aware that a portion of the interface (e.g., the document fill component 410) is actually provided remotely by the server computing device 12b. The integrated user interface 400 has many benefits over systems and methods that only provide a single interface that is local to the user computing device 12a or remote from the user computing device 12a (e.g., at the server computing device 12b). For example, the integrated user interface 400 ensures that there is no lag time or perceivable delay due to data transmission over the network when the user is editing a document at the user computing device 12a, but still allows the content within the document fill component 410 to be populated and/or updated automatically and continuously (e.g., on the fly) by more powerful server computing devices. In addition, the integrated user interface 400 arranged as described herein allows user-inputted data to be stored on the server computing device 12b if so desired for secure storage or for re-use of answers and accessed at a later time on the same user computing device and/or a different user computing device by the user, particularly in instances where the user may desire to fill out certain portions of different documents in the same manner. For example, if a user routinely prepares legal documents for a particular client (e.g., non-disclosure agreements for a particular client), the user may access stored information regarding that client and/or that client's preferences for certain sections of the legal document via the document fill portion of the interface and have those portions of the document automatically populated (e.g., the client's name, address, etc., the clients preferred contract terms, and/or the like). However, it should be understood that a user's inputs may also be stored with the document being edited as part of the document's XML data, in some embodiments.

It should be understood that as a result of generating and providing the document fill component 410 via the server computing device 12b as described herein, an administrator or other entity that has control over the server computing device 12b can actively monitor the generation of the document fill component 410 as well as the use of the document fill component 410 by a user to ensure the document fill component 410 is being correctly utilized, to troubleshoot issues, and/or the like. This provides an advantage of software programming that is built into software that is installed directly on a user's computing device, as such software cannot be accessed without first gaining access to the user's computing device. In addition, providing the document fill component 410 on the server computing device 12b also allows for the software that generates and provides the document fill component 410 to be actively updated as needed to ensure that users always have the most up-to-date software without the need to have to locally install updates, as is necessary with other software programs. This arrangement also allows for regular document editing in the event that the server component is offline for any reason.

Still referring to FIGS. 1-4, the user may access the document to be edited, filled, and/or the like at block 310. That is, the user may access one or more portions of the integrated user interface 400 such as, for example, the document editing component 401 and/or the one or more document editing features 403 to start a new document, to open an existing document, to open a document template, and/or the like. In some embodiments, the user may access the document or a document template directly from within the user computing device 12*a* user interface (e.g., by selecting a file in a file browser or the like), which causes the integrated user interface 400 to open automatically to open the document.

In some embodiments, the document (or a portion thereof) may be locked from manual editing by the user at block 315. That is, the user may be prevented from directly editing the document (or a portion thereof) within the document display area 402 and/or via the document editing component 401 and may only edit the document (or certain portions thereof) by providing one or more inputs in the document fill component 410, as described in greater detail herein. It should be understood that the process described with respect to block 315 is optional, and that the user may have the ability to directly edit the document within the document display area 402 as well as by providing responses to the questions in the document fill component 410 in some embodiments.

At block 320, the document may be displayed in the document display area 402 of the document editing component 401. That is, once the document is accessed by the user, the document is viewable by the user within the document display area 402 of the document editing component 401 such that the user can view the contents of the document, scroll through the document, play multimedia files within the document, and/or edit the document, as described in greater detail herein. In addition to displaying the document in the document display area 402 of the document editing component 401, the document fill component 410 may also be displayed as part of the integrated user interface 400 at block 325, as described herein.

At block 330, one or more inputs may be received at the integrated user interface 400, and as a result, one or more actions may be completed at block 335. For example, one or more user inputs (e.g., text input, touch inputs, mouse clicks, voice inputs, haptic inputs, and/or the like) may be received at a portion of the integrated user interface 400 (e.g., within the document editing component 401 and/or within the document fill component 410). As a result, one or more actions that correspond to user inputs may be carried out as a result (e.g., determining one or more locations within the document to input data and/or inserting the data into the one or more locations). FIGS. 4-10 described hereinbelow provide illustrative embodiments for carrying out actions as a result of receiving one or more inputs. In the embodiments depicted in FIGS. 4-10, a user may generate and/or amend portions of a legal document such as a contractual agreement that is displayed in the document display area 402 of the document editing component 401 by providing inputs within the document editing component 401 and/or the document fill component 410. However, it should be understood that this is merely an example, and any type of document may be edited with any kind of data.

Figure 5:
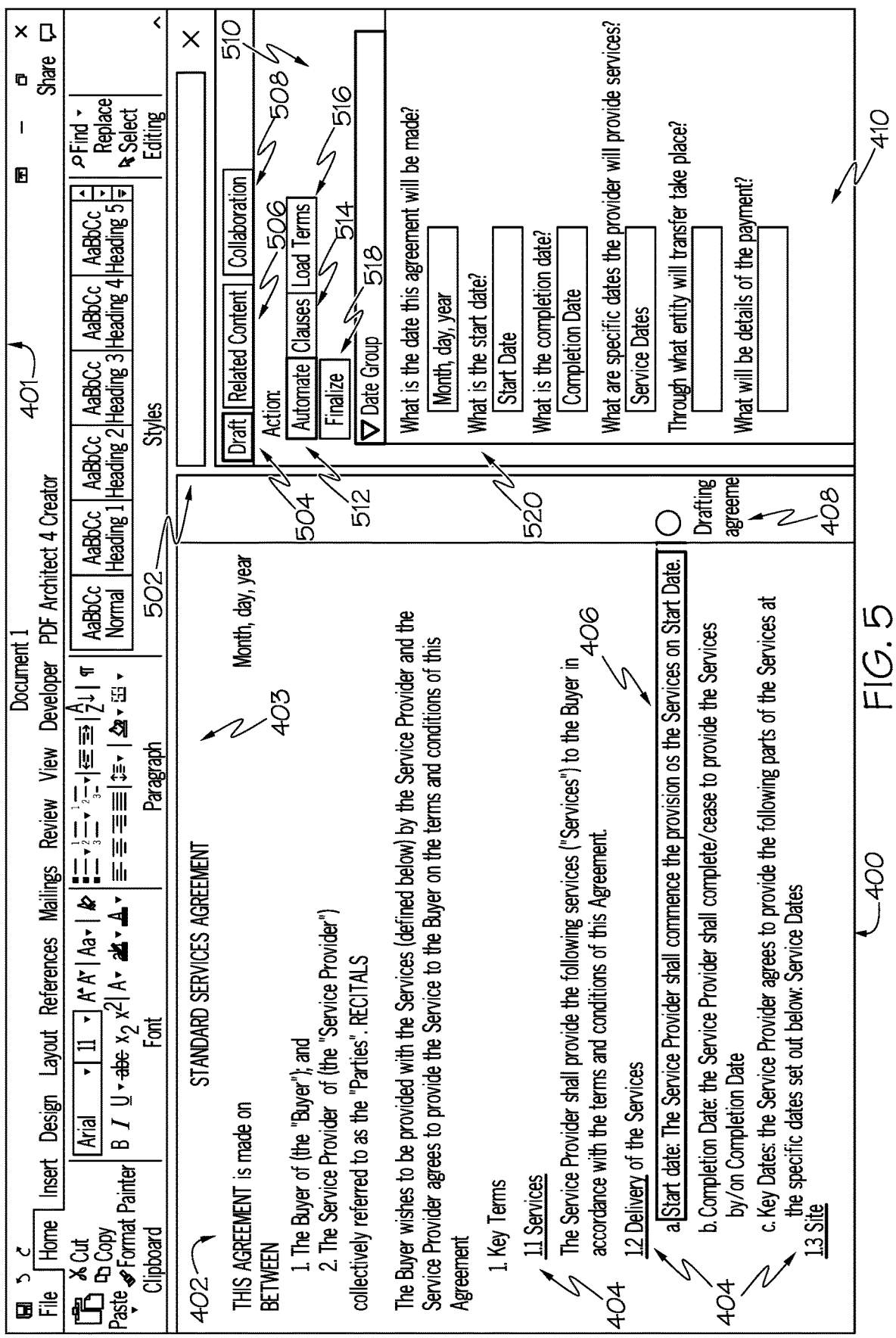
FIG. 5 depicts a screen shot of an illustrative user interface for providing automatic document filling functionality in an initial state according to one or more embodiments shown and described herein.

To provide one or more inputs, the user may be provided with one or more menus, selectable items, questions, response boxes, calendars, drop down response items, and/or the like and may present the same via the integrated user interface 400 within the document fill component 410. For example, the server computing device 12*b* may present the document fill component 410 as shown in FIG. 5. In the embodiment depicted in FIG. 5, the document fill component 410 includes a plurality of primary tabs 502 that relate to various editing functions that are available within the document fill component 410. For example, the plurality of primary tabs 502 may include a draft tab 504, a related content tab 506, and a collaboration tab 508. The draft tab 504, when selected, may generally provide information, questions, and/or the like that are used to elicit a response from the user for the purposes of completing and/or filling out portions of the document displayed in the document display area 402 of the document editing component 401, as described in greater detail herein. The related content tab 506, when selected, may provide information contained within the document and/or external content (e.g., website content) that relates to the document displayed in the document display area 402 of the document editing component 401 (or portions thereof). For example, if a user selects and highlights text from the document within the document display area 402 of the document editing component 401 and then clicks on the related content tab 506, the document fill component 410 may provide information that corresponds to the highlighted text. The collaboration tab 508, when selected, may generally display components that provide functionality for collaborating with others on a document. For example, a section of the collaboration tab 508 may be used in legal documents when multiple parties may collaborate to amend the same document to achieve a collective goal (e.g., multiple parties to a contractual agreement may amend the contract document).

As mentioned, the draft tab 504 is selected in the embodiment depicted in FIG. 5. As such, one or more of a plurality of action selectors 510 may be displayed to a user within the document fill component 410. The action selectors 510 may generally relate to particular actions that can be completed to fill portions of the document within the document display area 402 of the document editing component 401. For example, in the embodiment depicted in FIG. 5, selectable action selectors 510 include an automate action button 512, a clauses action button 514, a load terms action button 516, and a finalize action button 518. The automate action button 512, when selected, may generally cause the document fill component 410 provide a user with an ability to automatically fill particular portions of the document displayed within the document display area 402 of the document editing component 401 when particular submenus are selected, as described in greater detail hereinbelow. The clauses action button 514, when selected, may generally provide a user with an ability to fill standard clauses in the document displayed in the document display area 402 of the document editing component 401. For example, the user may select the clauses action button 514 and subsequently select particular contract clauses (including boilerplate clauses and/or user preferred clauses) into the document at a particular location thereof. In another example, if a user is an attorney for a professional sports team and is preparing an employment contract for a professional athlete that has a pilot's license and particular clauses have been previously been used and saved that pertain to restrictions on flying, the user may select the clauses action button 514 and select a saved clause that specifically pertains to restrictions on flying for entry within the document displayed in the document display area 402 of the document editing component 401. The finalize action button 518, when selected, may generally cause the document fill component 410 to display one or more document finalization functions. For example, one or more document finalization functions may be used to lock a document from further editing, complete final verification checks, and/or the like. In another example, another document finalization function may be to remove all of the editable fields from the document in the document editing component 401, remove any pre-created callouts from the document, and/or the like to create the final version of the document. In addition, electronic signature (e.g., e-signature) blocks may also be added during the finalization step to adhere to more electronic agreements.

Figure 6:
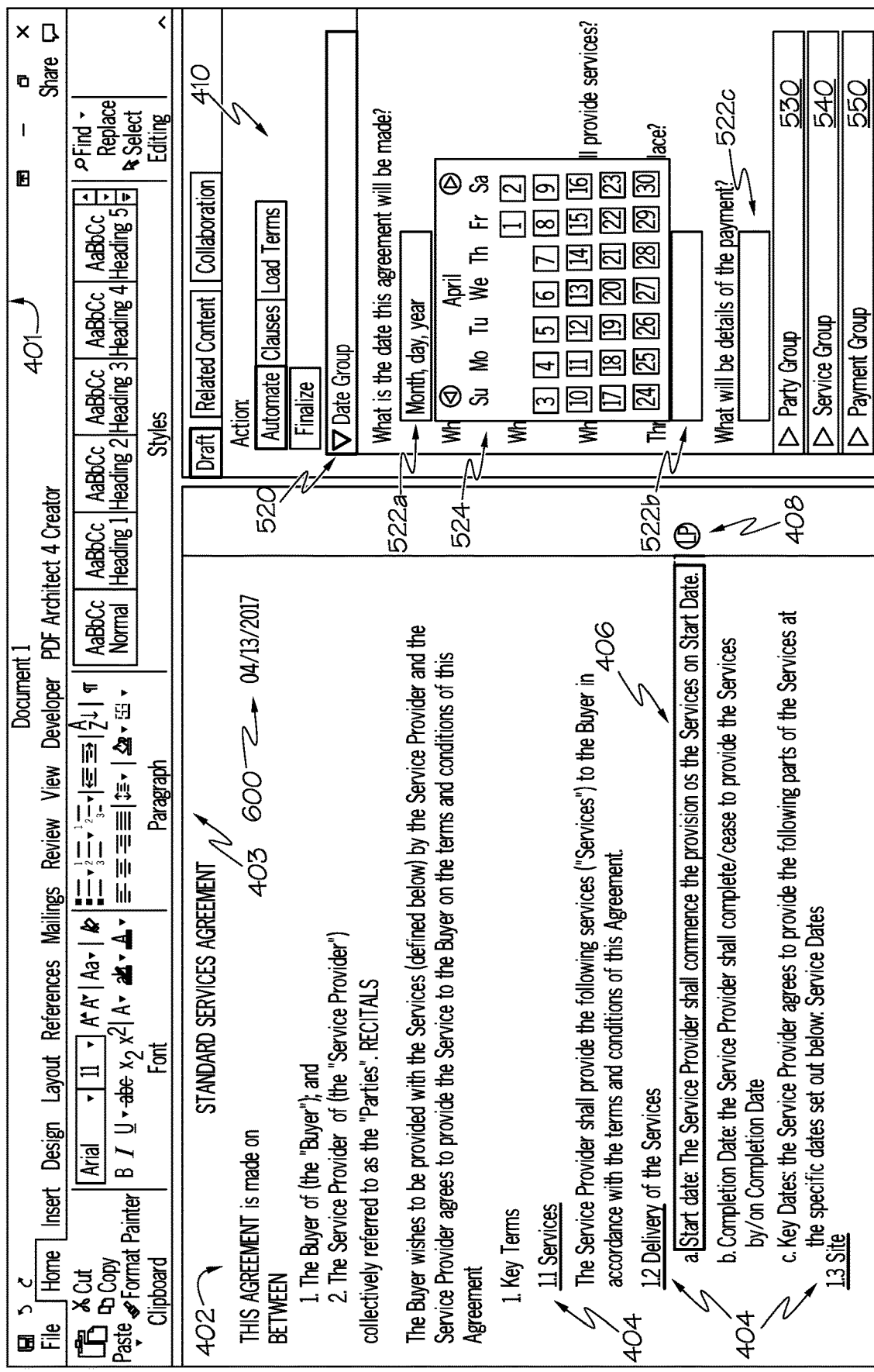
FIG. 6 depicts a screen shot of an illustrative user interface for providing automatic document filling functionality when interacting with a user according to one or more embodiments shown and described herein.

In the embodiment depicted in FIG. 5, the automate action button 512 is selected. As such, a plurality of groups that correspond to various sections of the document displayed in the document display area 402 of the document editing component 401 that can be edited and/or populated from selections in the document fill component 410. One such illustrative group is a date group 520. The date group 520 may generally include one or more dates that are to be populated within the document displayed in the document editing component 401. For example, editable field 406, as indicated by the box surrounding the text, relates to a start date at which the service provider will commence the provision of services. The server computing device 12*b* analyzes the editable fields of the document and the associated XML information as described herein and associates various questions within the date group 520 that correspond to the editable field 406. In some embodiments, the server computing device may use artificial intelligence and/or machine learning to analyze the fields and associate questions. As such, the user may be asked questions such as the date the agreement will be made, the start date, the completion date, specific dates that services will be provided, and/or the like. Referring now to FIG. 6, after each question 524 in the date group 520 is an answer field 522 (e.g., a first answer field 522*a*, a second answer field 522*b*, a third answer field 522*c*, etc.), which may be a text box, a selection menu, a popup calendar, or the like. In the answer field 522*a* depicted in FIG. 6 in response to a question 524 "What is the date this agreement will be made?," upon user selection, a calendar may be displayed. The user may then select a date from the calendar, which may cause one or more corresponding editable fields 406 within the document displayed in the document display area 402 of the document editing component 401. As shown in FIG. 6, the user has selected Apr. 13, 2017 in the calendar that is displayed in the first answer field 522*a*. As such, the corresponding date field 600 in the document displayed in the document display area 402 of the document editing component 401 is populated with the same date.

Figure 7:
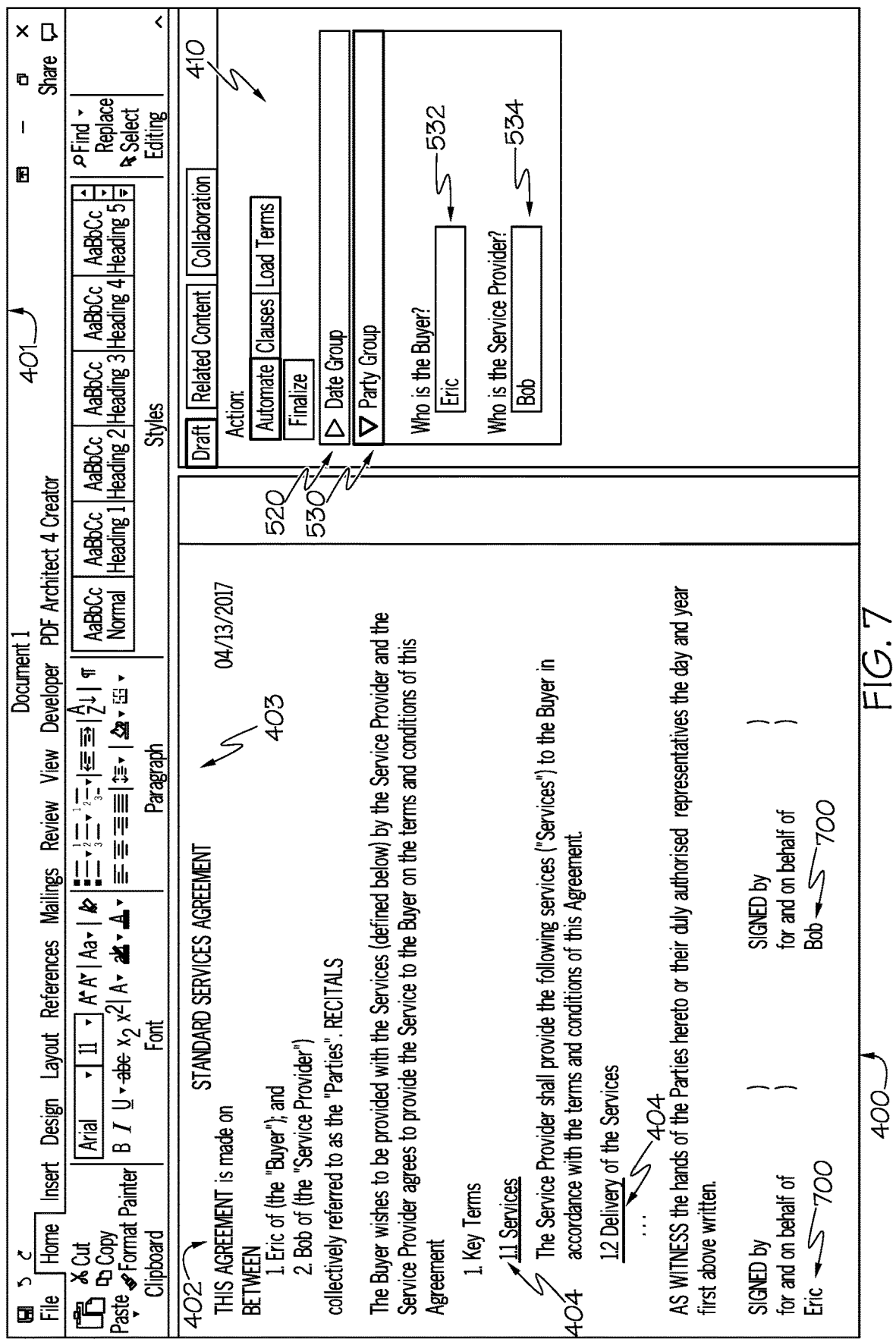
FIG. 7 depicts a screen shot of another illustrative user interface for providing automatic document filling functionality when interacting with a user according to one or more embodiments shown and described herein.

The embodiment depicted in FIG. 6 further illustrates other groups that may be displayed in addition to the date group 520. More specifically, FIG. 6 depicts a party group 530, a service group 540, and a payment group 550, each of which is in a collapsed configuration. When one of the other groups is selected by the user by clicking on the group, the group may be expanded to reveal the contents of the group. For example, as shown in FIG. 7, the party group 530 is expanded to show information regarding the parties to the contract document displayed by the document display area 402 of the document editing component 401. More specifically, the party group 530 includes questions asking a user "Who is the Buyer?" and "Who is the Service Provider?", both of which were generated as a result of the process completed at block 325 described herein with respect to FIG. 3. Still referring to the embodiment depicted in FIG. 7, each question is preceded with an answer block (e.g., a first answer block 532 and a second answer block 534), which are configured to receive text from the user. When a user inputs text in the first answer block 532 and/or the second answer block 534, corresponding text 700 is automatically populated anywhere it is found within the corresponding areas of the document displayed in the document display area 402 of the document editing component 401.

Figure 8:
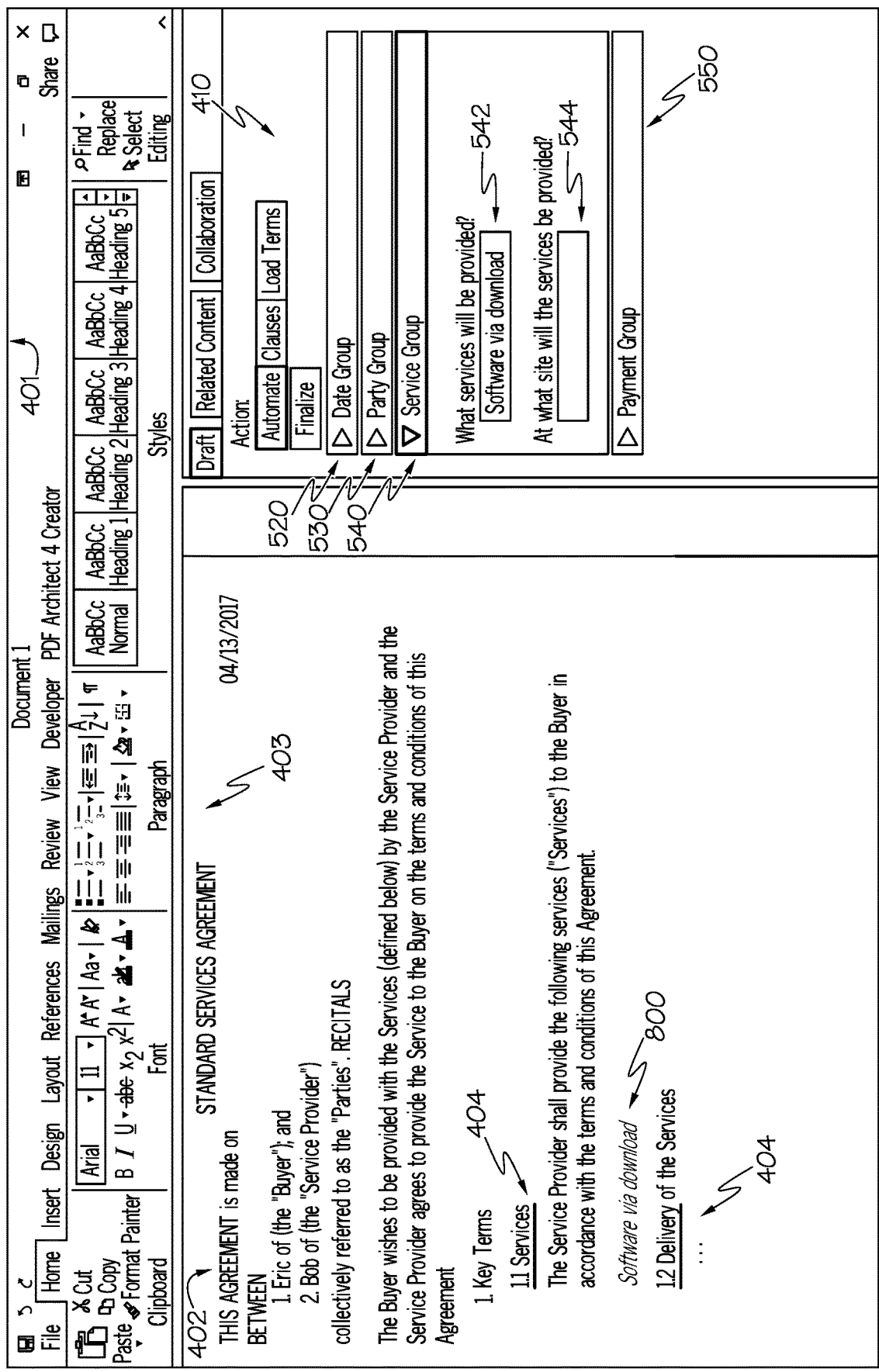
FIG. 8 depicts a screen shot of yet another illustrative user interface for providing automatic document filling functionality when interacting with a user according to one or more embodiments shown and described herein.

Similarly, when the service group 540 is expanded, particular questions that specifically relate to services may be displayed, as shown in the embodiment depicted in FIG. 8. That is, the service group 540 is expanded to show information regarding the services that are the subject of the contract agreement displayed by the document display area 402 of the document editing component 401. More specifically, the service group 540 includes questions asking a user "What services will be provided?" and "At what site will the services be provided?", both of which were generated as a result of the process completed at block 325 described herein with respect to FIG. 3. Still referring to the embodiment depicted in FIG. 8, each question is preceded with an answer block (e.g., a third answer block 542 and/or a fourth answer block 544), which are configured to receive text from the user. When a user inputs text in the third answer block 542 and/or the fourth answer block 544, corresponding text 800 is automatically populated in the corresponding areas of the document displayed in the document display area 402 of the document editing component 401.

Figure 9:
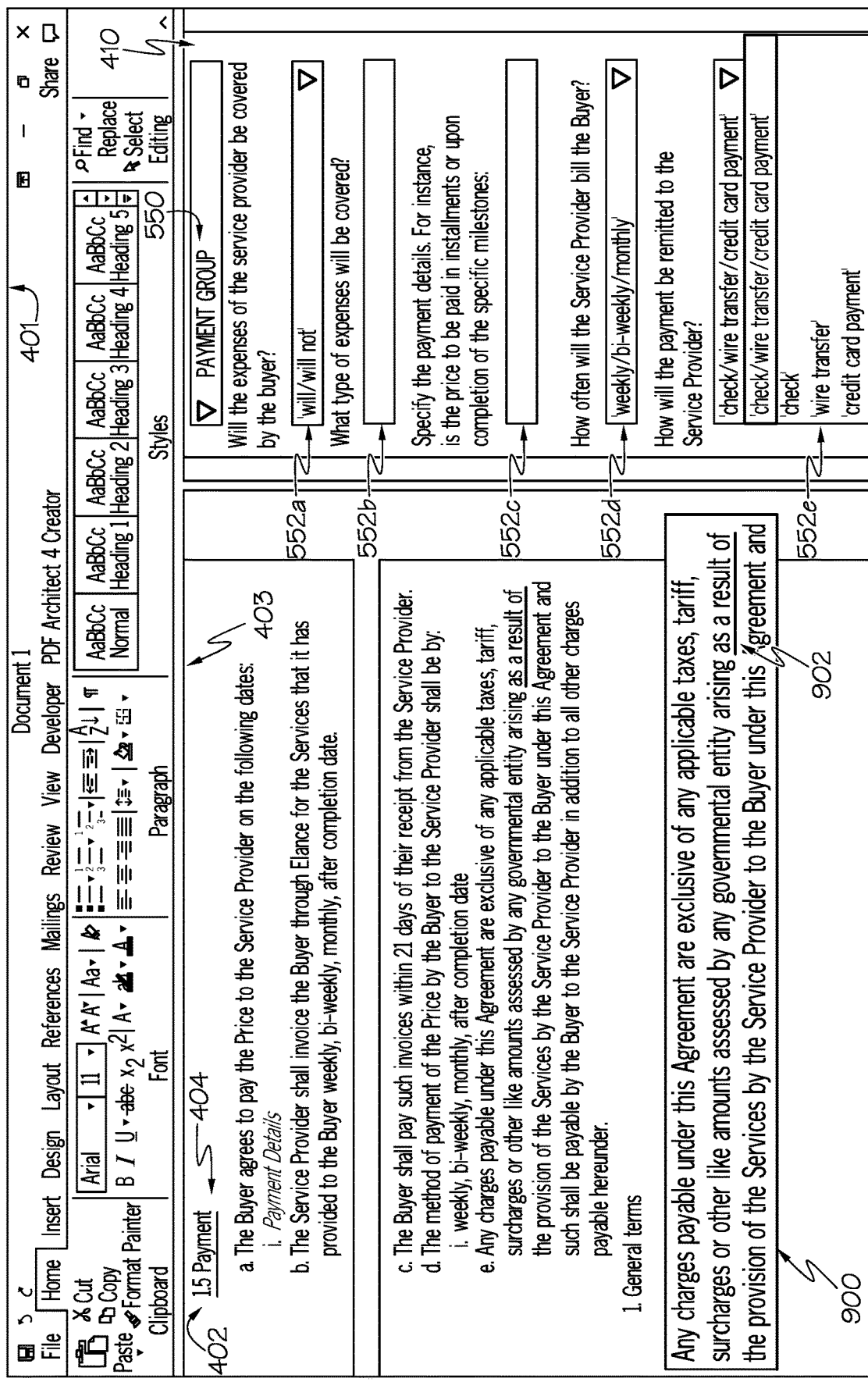
FIG. 9 depicts a screen shot of yet another illustrative user interface for providing automatic document filling functionality when interacting with a user according to one or more embodiments shown and described herein.

Similarly, when the payment group 550 is expanded, particular questions that specifically relate to payments may be displayed, as shown in the embodiment depicted in FIG. 9. That is, the payment group 550 is expanded to show information regarding the payments that are the subject of the contract agreement displayed by the document display area 402 of the document editing component 401. More specifically, the payment group 550 includes questions asking a user "Will the expenses of the service provider be covered by the buyer?, "What type of expenses will be covered?", "Specify the payment details", "How often will the Service Provider bill the Buyer?", and "How will the payment be remitted to the Service Provider?", each of which were generated as a result of the process completed at block 325 described herein with respect to FIG. 3. Still referring to the embodiment depicted in FIG. 9, each question is preceded with an answer block 552 (e.g., a fifth answer block 552*a*, a sixth answer block 552*b*, a seventh answer block 552*c*, an eighth answer block 552*d* and/or a ninth answer block 552*e*), which are configured to receive text from the user, be drop down boxes with selectable text, and/or the like. When a user inputs text in answer blocks 552, selects a drop-down box selection, and/or the like, corresponding text 900, 902 is automatically populated in the corresponding areas of the document displayed in the document display area 402 of the document editing component 401.

It should be understood that, based on certain user inputs, various questions, answer blocks 552, groups, and/or the like may be displayed, hidden, or otherwise rendered active or inactive based on inputs supplied by a user to other areas of the document fill component 410. For example, the party group 530 displayed in the document fill component 410 may be initially configured to accept an unlimited number of party names (e.g., for filling contract documents having more than two parties to an agreement). However, if a user input within the document fill component 410 and/or the document displayed in the document display area 402 of the document editing component 401 is indicative of only two parties (e.g., the user specifies that a particular agreement has one buyer and one seller), the options within the party group 530 that pertain to a single party or more than two parties may be hidden, greyed out, or otherwise inactivated such that a user input cannot be received in those options. In another example, if a user specifies that no payment is required for a particular agreement (e.g., each party is providing services), then the payment group 550 may be hidden, greyed out, unable to expand, or otherwise rendered inaccessible to the user since payment information need not be entered by the user.

Figure 10:
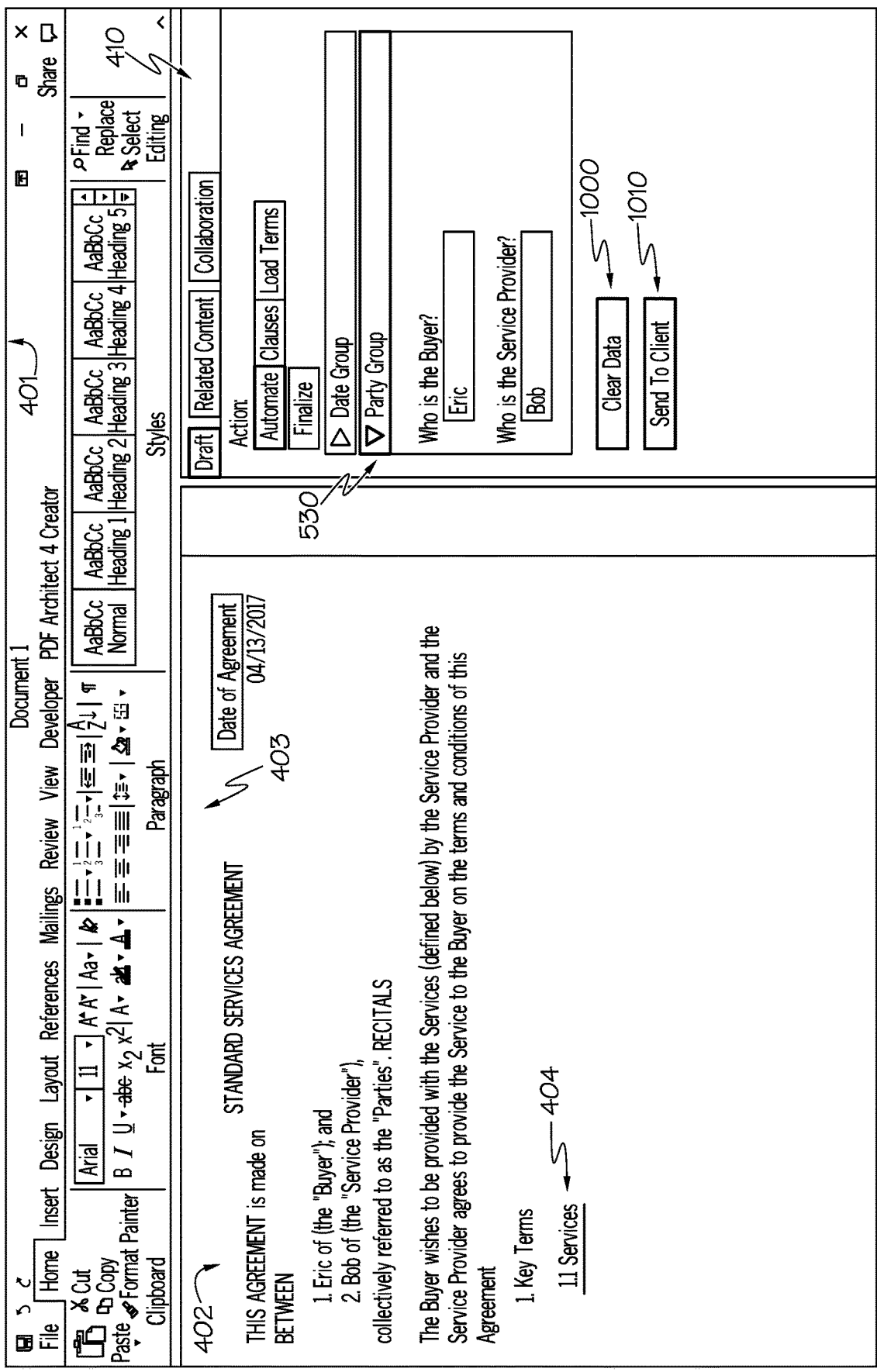
FIG. 10 depicts a screen shot of an illustrative user interface for providing automatic document filling functionality when sending a completed document according to one or more embodiments shown and described herein.

In some embodiments, the document fill component 410 may further include one or more additional options for a user, as shown for example in the embodiment depicted in FIG. 10. For example, the document fill component 410 may include an option to clear data, as indicated by the "Clear Data" button 1000 and/or an option to send the document to another person, as indicated by the "Send To Client" button 1010. While not depicted in FIG. 10, the user may also be provided with an option to save certain portions of the content within the document fill component 410 for later use, such as commonly used clauses, commonly used names and addresses, and/or the like.

In some embodiments, a user may enter text or other data directly into the document displayed in the document display area 402 of the document editing component 401 instead of (or in addition to) providing inputs in the document fill component. When this occurs, the server computing device 12b may recognize the inputs as being modifications to previously identified fields within the document (e.g. by monitoring the changes to the XML data), and may automatically populate other portions of the document accordingly in a manner that is the same as if the user had entered the data into the document fill component 410. For example, if a user enters a date in a particular field of the document in the document display area 402 that is recognized as being identical to other areas of the document where the same date is to be entered, the same date may be automatically populated within the remainder of the document accordingly.

Figure 11:
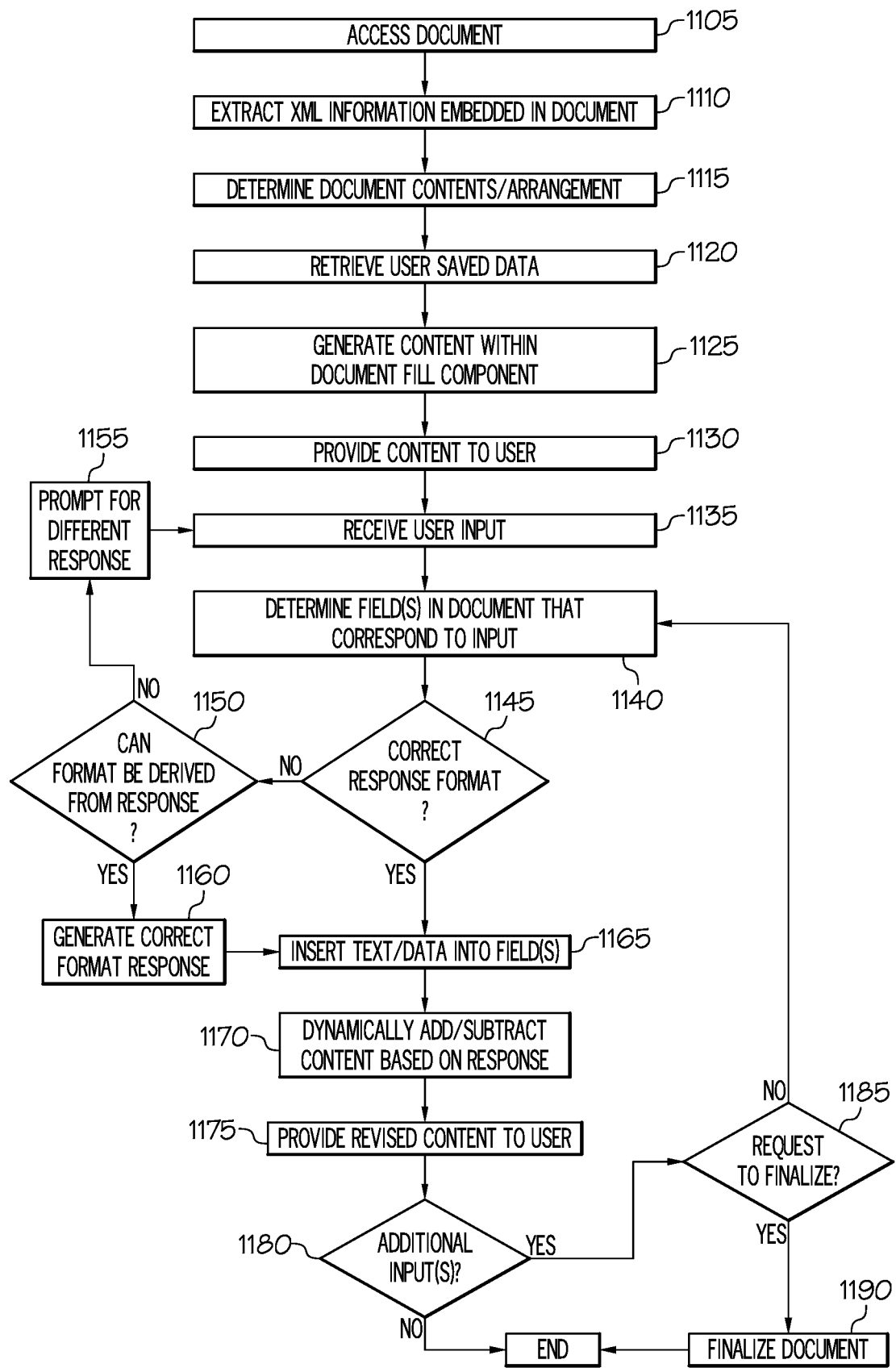
FIG. 11 depicts a flow diagram of an illustrative detailed method of generating content within a document fill component and receiving a user input for the purposes of providing automatic document filling functionality according to one or more embodiments shown and described herein.

Referring now to FIG. 11 (also with reference to FIGS. 1 and 4), additional details regarding the processes completed by the server computing device 12b and/or the user computing device 12a to provide automatic document filling functionality is described. The processes described with respect to FIG. 11 can be completed entirely by the server computing device 12b, entirely by the user computing device 12a, or by a combination of the server computing device 12b and the user computing device 12a, unless specifically provided.

At block 1105, a document is accessed. The document may be accessed by the user computing device 12a and/or the server computing device 12b. The document may be stored on any storage device, including storage devices that are local to the user computing device 12a, storage devices that are local to the server computing device 12b, and storage devices that are remote from the user computing device 12a and the server computing device 12b. The document may generally be accessed such that the contents of the document can be analyzed, including any associated XML data.

At block 1110, the XML information within the document may be extracted. That is, the document file or a portion thereof may be provided to the server computing device 12b such that XML information therein (e.g., embedded within the document) can be obtained. For example, if the document is a .docx file format document, the compressed XML files within the .docx file may be extracted and transmitted to the server computing device in part or in full and may be sent real time as the user interacts with the document. 12b. In another example, the entire document may be transmitted to the server computing device 12b such that the pertinent XML information or other related information is extracted therefrom.

At block 1115, the server computing device 12b may determine the contents of the document and/or arrangement of features within the document. That is, the server computing device 12b may analyze the XML information and determine whether sections of the document can be populated and/or generated using one or more questions and user responses. For example, if the XML information indicates that at least a portion of the document contains one or more text entry fields for entering a user's name and mailing address, the server computing device 12b may determine that one or more questions pertaining to the user's name and mailing address may be included in the document fill. In another example, if the document is a contract that frequently uses the same terms (e.g., a particular name for a particular party), the server computing device 12b may determine that one or more questions pertaining to the parties' names may be included in the document fill. In some embodiments, such a determination may be made based on saved user preferences. For example, if a user desires each document that is opened to be appended with a particular clause at a particular location within the document, the server computing device 12b may determine the contents and/or arrangement of features from the XML information to determine the particular location therein to insert the clause, and to determine whether to provide a question in the document fill asking the user to affirm the insertion and/or location of the clause. Illustrative examples of XML information is depicted in FIGS. 12A-12D.

Still referring to FIG. 11 (with reference to FIGS. 1-2 and 4), user saved data (e.g., external data) may be retrieved at block 1120 in some embodiments. That is, if the user has previously saved data in a storage device (e.g., within the data storage component 36 of the server computing device 12b) or elsewhere such as a document management system or an online storage provider, the data may be accessed for the purposes of ensuring the content that is provided to the user corresponds to the saved data, such as user preferences, previously prepared document sections 404, and/or the like. For example, if the user has saved boilerplate clauses, party names, and/or the like that are frequently used for a particular document (e.g., a legal contract), the saved boilerplate clauses, party names, and/or the like may be retrieved for the purposes of populating the document fill component 410 in the event the user desires to use the saved data. It should be understood that block 1120 is optional and may not be utilized in some embodiments.

At block 1125, content for the document fill component 410 may be generated and populated within the document fill component 410. That is, one or more menus, selection boxes, text entry boxes, questions, and/or the like may be generated and used to populate the document fill component 410. For example, with reference to FIG. 5, the date group 520, the party group 530, the service group 540, and the payment group 550 may be generated, as well as certain options and selectable entries that allow the user to fill in information that is used to populate a document, as described herein. Referring again to FIG. 11 (with reference to FIGS. 1 and 4), once the content for the document fill component 410 has been generated, it may be provided to the user at block 1130. That is, the generated document fill component 410 may be presented alongside the document display area 402 of the document editing component 401, as described herein.

At block 1135, one or more user inputs may be received. The user inputs are not limited by this disclosure and may include one or more mouse clicks, keyboard inputs, touch inputs, haptic inputs, voiced inputs, gestures, and/or the like. For example, the input may be in the form of text entry, numeric figure entry, selection/deselection of a check box or radio button, calendar selector, date selector, uploading or embedding of a file (including an image file), and/or the like. The one or more user inputs may generally correspond to a user's interaction with the integrated user interface 400, including the document editing component 401 and the document fill component 410. For example, if a user desires to select the date group 520 (FIG. 5) and enter in calendar entries, the inputs that are received may generally be inputs that correspond to an area within the integrated user interface 400 that includes the date group 520 and the content within the date group 520. In another example, the user may enter information directly into the document displayed by the document display area 402 of the document editing component 401.

At block 1140, upon receiving the one or more inputs, a determination may be made as to the one or more fields within the document displayed in the document display area 402 of the document editing component 401 that corresponds to the one or more inputs. For example, if a user clicks on the date group 520 and then selects a calendar entry for Apr. 13, 2017 as the date of the agreement (as shown and described herein with respect to FIG. 6), the system may determine a location in the document where such a date should be entered (e.g., the upper right hand corner of the document, as depicted in FIG. 6). In some embodiments, this process may include determining document content and/or arrangement from the XML information, as previously described herein with respect to block 1115. As previously described herein, such a determination may also be based on the inputs received directly within the document displayed by the document display area 402 of the document editing component 401. That is, a determination may be made as to one or more additional locations within the document to input data based on the inputs received directly within the document, and then the data may be inserted into those additional locations.

Figure 4:
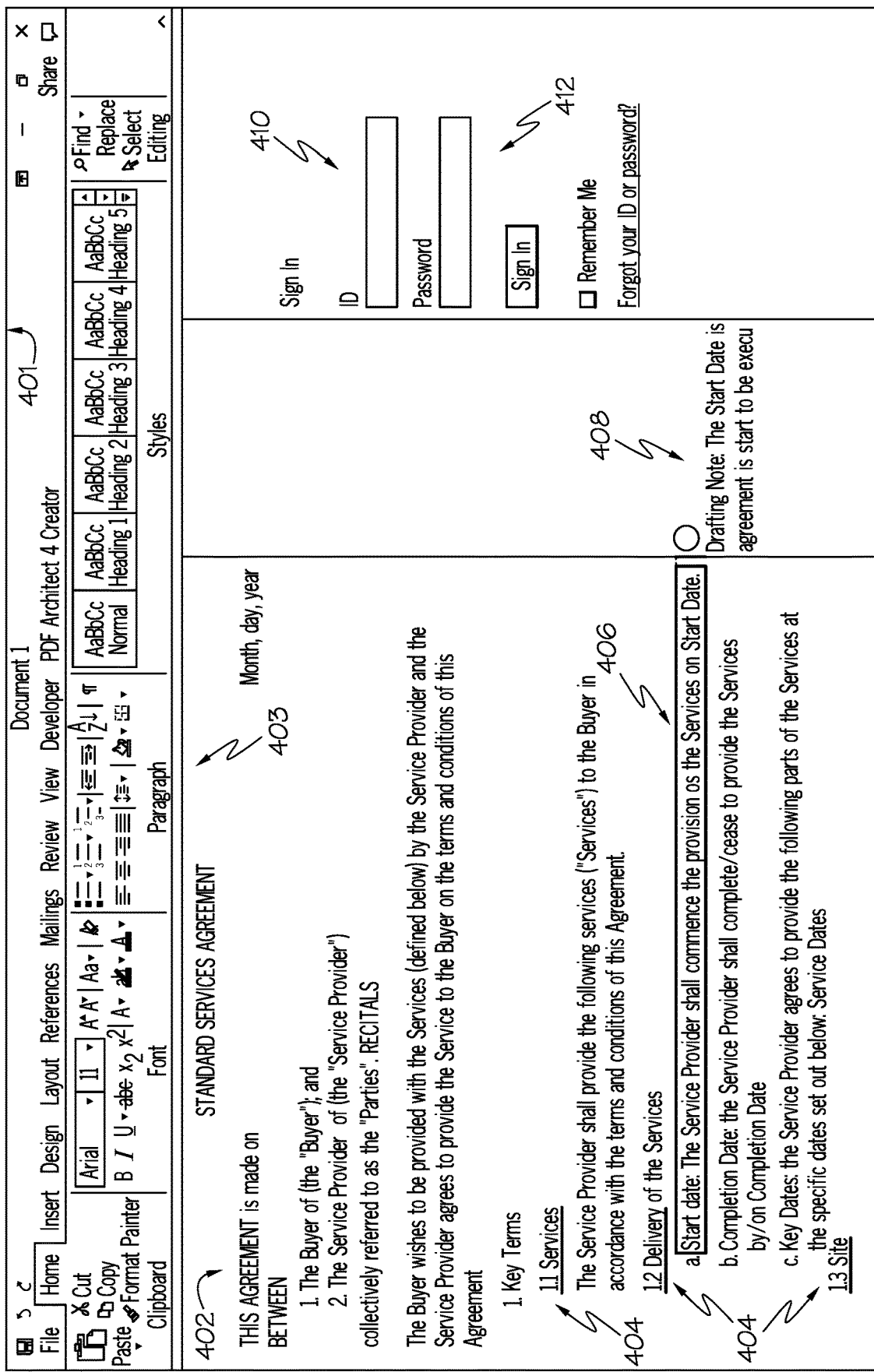
FIG. 4 depicts a screen shot of an illustrative user interface for providing automatic document filling functionality according to one or more embodiments shown and described herein.

Still referring to FIGS. 1, 4, and 11, a further determination may be made as to whether the format provided by the user corresponds to the format that is used for the document at block 1145. For example, if a text entry box is provided in the document fill component 410 for a user to manually enter a date (e.g., by typing a date via a keyboard input) and the inputs received from the user indicate a different format (e.g., text other than the standard MM/DD/YYYY format or other similar format, such as a person's name), the determination at block 1145 may be that the format provided by the user does not correspond to the format that is used for the document. Such a determination may be based on, for example, information within the associated XML data for a particular form field.

If the response format is not correct, another determination may be made at block 1150 as to whether the format can be derived from the response. For example, if a user clicks on a date group 520 (FIG. 5) and manually inputs "April thirteenth of this year" into a text box requiring a date, the system may be configured to recognize that while the inputted text does not correspond to a correct format (e.g., the MM/DD/YYYY format), the date can still be determined and adjusted accordingly (e.g., "04/13/2017"). Conversely, if the user manually inputs "Bob Smith" into the same text box, the system may not be able to derive a corrected format response from the input because "Bob Smith" does not correspond to any known date. In some embodiments, the format may be derived from the response by performing one or more calculations to arrive at the correct format based on the input that was received. For example, if the correct format is a numerical entry but the supplied input is (e.g., 540×15), it may be recognized that the supplied input is an equation that can be calculated. Accordingly, the calculation may be completed and the correct format response (e.g., 8100) may be generated.

If the format cannot be derived from the response, the user may be prompted for a different response at the integrated user interface 400 at block 1155. That is, the user may receive an error message or the like indicating that the input provided is incorrect and that a new input is needed. Accordingly, the process may return to block 1135 to receive additional user inputs. If the format can be derived from the response, the correct format response (e.g., "04/13/2017" as used in the example above) may be generated at block 1160 and the process may move to block 1165.

If the format of the input is correct at block 1145 (or can be derived from the response input according to blocks 1150 and 1160, such as by performing one or more calculations), the system may insert the text and/or data into the corresponding fields within the document displayed in the document display area 402 of the document editing component 401 at block 1165. Using the example from above, the date may be inserted into the corresponding area (upper right hand corner of the document depicted in FIG. 6 for example). In some embodiments, the document displayed in the document display area 402 of the document editing component 401 may have a plurality of fields that receive the same entry (e.g., a party's name may be inserted throughout a document). As such, text that is provided in the text box via the user inputs in the document fill component 410 (e.g., "Bob Smith" as a party name) may be populated in each area of the document that corresponds to the text box (e.g., each location in a document where a party name is to be placed).

In some embodiments, the content within the document fill component 410 may be modified (e.g. dynamically updated) as one or more inputs are received from a user at block 1170. That is, if a user provides one or more inputs at first section of the document fill component 410 that negate the need for additional information in a second section of the document fill component 410, the second section of the document fill component 410 may by dynamically removed or otherwise deactivated so that the user cannot provide inputs at the second section. For example, if the user inputs a start date of "Apr. 13, 2017" and also specifies that the term of the contract is one year, the system may automatically determine that a section within the document fill component 410 that requests a contract end date is unnecessary because the contract end date can be automatically determined from the start date (e.g., Apr. 13, 2018). As such, the section relating to the contract end date may be removed, greyed out, or otherwise locked so that the user cannot provide inputs at that section. Accordingly, the revised content within the document fill component 410 may be provided to the user at block 1175.

At block 1180, a determination may be made as to whether additional inputs have been received. If no additional inputs have been received, the process may end. If additional input(s) are received, a determination may be made at block 1185 as to whether the additional input(s) include a request to finalize the document. For example, a request to finalize the document may be determined if the user clicks on the "Send To Client" button 1010 or otherwise indicates that the document is ready to be finalized. If the additional input(s) are not indicative of a request to finalize the document, the process may repeat at block 1140. If the input(s) are indicative of a request to finalize the document, the document may be finalized at block 1190 and the process may then end. Additional steps such as emailing the document, saving the document to a cloud server, and/or the like may also be completed prior to the process ending, as described herein.

As a result of the processes described hereinabove with respect to FIG. 11, the document fill component 410 is customized to each particular document that is displayed within the document display area 402 of the document editing component 401 and/or customized to a particular user and/or user's preferences. That is, the contents within the document fill component 410 are not a large, unwieldy decision tree that has several irrelevant questions and response entries that may not have anything to do with the document that is displayed within the document display area 402 of the document editing component 401 and/or are not aligned with a particular user's preferences.

In some embodiments, a change log of the inputs that were supplied by the user may be maintained. The change log may track information, such as, but not limited to, the user's identity, the identity of fields in which the user entered or removed data, a time stamp of when data was added/removed, and/or the like. In some embodiments, the change log may be maintained for each user of the form to be filled. As such, information regarding the changes to the form can be maintained as the form is passed around from user to user or in instances where the form is a shared document supplied by a shared document editor (e.g., Google® Docs, Microsoft® Office 365®, etc.). The change log may be stored locally with the form, as an appended file, as a portion of the XML file, and/or at an offsite location (e.g., a DMS system, a blockchain, and/or the like) such that it can be accessed to style the form as needed, used to compare various edits as a black line document, used to compare various edits as a red line document, used to view tracked changes, and/or the like. In some embodiments, the change log may be stored at a central location for the purposes of backup, entity recognition, reuse of answers across multiple documents (i.e., in a suite or set of related documents), and/or the like. In other embodiments, the change log may be stored at a distributed locations (e.g., in a blockchain).

The systems and methods described herein may also allow the form to be saved as a document that is "frozen in time" such that all edits to the form at a particular time are captured at that particular time.

It should now be understood that the systems, methods, and computer-readable media described herein provide a software addition (e.g., an add-in, a plugin, or the like) to an existing software program, such as a word processing program for the purposes of assisting a user in filling the contents of a document that is edited in the existing software program. The software addition generally allows a user of the software program to provide answers to a series of questions and/or complete a plurality of sections of a document by filling in a dynamic form, which results in an automatic population of the document in particular areas. As a result, the populated form is correctly filled with accurate information and the document has consistent entries where necessary. In addition, the user may be less confused about what information to put in particular fields in a document and may be able to fill a document more accurately in less time. Furthermore, the user never has to leave his/her primary document editing program when editing a document, and need not be concerned as to whether the document will read and/or be formatted appropriately because all changes can be viewed within the document editing program at the same time the edits are made, regardless of whether the edits are made directly within the document or via the document fill component. Moreover, because the document is edited directly by the user and/or the document fill component, all information is stored directly within the document and does not require any special software, plugins, and/or the like to be installed when the document is subsequently viewed on a different computing device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing automatic document filling functionality, the method comprising:
   providing, by a processing device, an integrated interface comprising:
      a document editing component selected from a word processing program, a spreadsheet editing program, and a presentation editing program, the document editing component having a document display area for displaying a document and one or more document editing features for editing the document, wherein the document is a word processing document, a spreadsheet, or a slide presentation document, and
      a document fill component having contents that elicit one or more text inputs that are used to fill the document;
   extracting XML data associated with the document;
   determining, by the processing device, a contents of the document and an arrangement of features within the document based on the XML data, wherein at least one of the contents of the document and the arrangement of features is indicative of one or more locations within the document to input user data;
   generating the contents of the document fill component to elicit the one or more text inputs based on the contents of the document and the arrangement of features within the document;
   receiving the text inputs into the document fill component from a user;
   determining one or more of the locations within the document to input the user data based on the text inputs;
   locking, by the processing device, the document such that a portion of the document is not editable via the document editing component;
   inserting the user data into the one or more locations within the document based on the text inputs; and
   generating or updating the XML data associated with the document with information pertaining to the one or more text inputs, the user data, and the one or more locations.

2. The method of claim 1, further comprising:
   receiving, via the one or more document editing features, one or more editing inputs for manually editing the document;

determining one or more additional locations within the document to input data based on the received one or more editing inputs, the contents of the document, and the arrangement of features; and inserting the data at the one or more additional locations.

3. The method of claim 1, wherein providing the integrated interface comprises:

providing the document editing component via a user computing device; and providing the document fill component via a server computing device that is remote from the user computing device.

4. The method of claim 1, further comprising performing one or more calculations based on the one or more text inputs that are received.

5. The method of claim 1, further comprising receiving external data, wherein inserting the user data into the one or more locations within the document further comprises inserting the external data into at least one location within the document.

6. The method of claim 1, wherein receiving the one or more text inputs comprises:

determining that the one or more text inputs is not in a correct response format; and one of:
prompting for a different text input; or
generating a correct response format response.

7. A system for providing automatic document filling functionality, the system comprising:

a processing device; and a non-transitory, processor-readable storage medium, the non-transitory, processor-readable storage medium comprising one or more programming instructions that, when executed, cause the processing device to:

provide an integrated interface comprising:

a document editing component selected from a word processing program, a spreadsheet editing program, and a presentation editing program, the document editing component having a document display area for displaying a document and one or more document editing features for editing the document, wherein the document is a word processing document, a spreadsheet, or a slide presentation document, and a document fill component having contents that elicit one or more text inputs that are used to fill the document;

extracting XML data associated with the document;

determine a contents of the document and an arrangement of features within the document based on the XML data, wherein at least one of the contents of the document and the arrangement of features is indicative of one or more locations within the document to input user data;

receive the text inputs into the document fill component from a user;

determine one or more of the locations within the document to input the user data based on the text inputs;

lock the document such that a portion of the document is not editable via the document editing component;

insert the user data into the one or more locations within the document based on the text inputs; and generate or update the XML data associated with the document with information pertaining to the one or more text inputs, the user data, and the one or more locations.

8. The system of claim 7, wherein the one or more programming instructions, when executed, further cause the processing device to:

receive information regarding the document fill component from a server computing device that is remote from the processing device; and provide the document fill component according to the information.

9. A system for providing automatic document filling functionality, the system comprising:

a user computing device that provides a first portion of an integrated interface, the first portion of the integrated interface comprising a document editing component having a document display area for displaying a document and one or more document editing features for editing the document, the document editing component selected from a word processing program, a spreadsheet editing program, and a presentation program, wherein the document is a word processing document, a spreadsheet, or a slide presentation document; and a server computing device that is remote from the user computing device, the server computing device providing a second portion of the integrated interface comprising a document fill component having contents that elicit one or more text inputs that are used to fill the document, wherein:

the user computing device comprises a display that displays the first portion and the second portion of the integrated interface and an input device that receives one or more inputs at one or more of the first portion and the second portion of the integrated interface, the server computing device extracts XML data associated with the document;

the server computing device determines a contents of the document and an arrangement of features within the document based on the XML, data, wherein at least one of the contents of the document and the arrangement of features is indicative of one or more locations within the document to input user data;

the server computing device generates the contents of the document fill component to elicit the one or more text inputs based on the contents of the document and the arrangement of features within the document;

the user computing device receives the text inputs into the document fill component from a user;

the server computing device determines one or more of the locations within the document to input the user data based on the text inputs;

the user computing device locks the document such that a portion of the document is not editable via the document editing component;

the server computing device inserts the user data into the one or more locations within the document based on the text inputs; and the server computing device generates or updates the XML data associated with the document with information pertaining to the one or more text inputs, the user data, and the one or more locations.

10. The system of claim 9, wherein the user computing device further receives, via the one or more document editing features, one or more editing inputs for manually editing the document.

11. The system of claim 9, wherein the server computing device:

determines that the one or more inputs is not in a correct response format; and one of:
prompts for a different input; or
generates a correct response format response.

12. The method of claim 1, further comprising generating or updating an appended file or a portion of a blockchain hash with the information pertaining to the one or more inputs, the data, and the one or more locations.

13. The method of claim 1, wherein generating or updating the VOL data further comprises generating or updating the XML data with information pertaining to at least one of an identity of a user providing the one or more inputs, and a time stamp of when the data was inserted.

* * * * *